Sept. 19, 1961  S. G. GRECO  3,000,188
GAS SEPARATION
Filed Nov. 15, 1956

INVENTOR.
SAVERIO G. GRECO
BY
D. H. Palmer
Cryan Alexander
ATTORNEYS

United States Patent Office 3,000,188
Patented Sept. 19, 1961

1

3,000,188
GAS SEPARATION
Saverio G. Greco, Brooklyn, N.Y., assignor to The M. W. Kellogg Co., Jersey City, N.J., a corporation of Delaware
Filed Nov. 15, 1956, Ser. No. 622,291
14 Claims. (Cl. 62—28)

This invention relates to the separation of a gaseous component from a mixture containing the same. One aspect of this invention relates to the production of ethylene.

Large supplies of olefin hydrocarbons are required for many industrial uses. Normally gaseous olefins such as ethylene and propylene are in particularly heavy demand for use in various industrial processes. The manufacture of polyolefin plastic of various kinds is typical of the industrial uses of these olefins. Ethylene is especially in demand for use in polymerization processes for the production of ethylene polymers and it is expected that the demand for ethylene and other olefins, particularly propylene, for similar uses will increase substantially in the future.

In recovering ethylene or other normally gaseous olefins from gaseous mixtures containing the same, difficulty is frequently encountered in obtaining a suitable separation without excessive cost. This is particularly true in situations where it is desired to separate an olefin such as ethylene or propylene from a mixture of olefinic and paraffinic hydrocarbons having the same number of carbon atoms. In such cases, considerable difficulty may be experienced in obtaining a suitable heat balance in the system while at the same time obtaining the most efficient use of the refrigerating system used.

It is an object of this invention to provide an improved process for the separation of a gaseous component from a mixture containing the same.

It is another object of this invention to provide an improved process for the recovery of ethylene from a normally gaseous mixture containing same.

Another object of this invention is to provide an improved process for the separation of a normally gaseous olefin from a normally gaseous mixture containing the same and the corresponding paraffin having the same number of carbon atoms.

It is a further object of this invention to provide an improved process for the separation of ethylene from a mixture comprising ethylene and ethane.

Another object of this invention is to provide an improved method of operating a distillation zone which is used for the separation of ethylene from a mixture comprising ethylene and ethane.

Other objects and advantages of this invention will become apparent from the accompanying description and disclosure.

Figure 1:
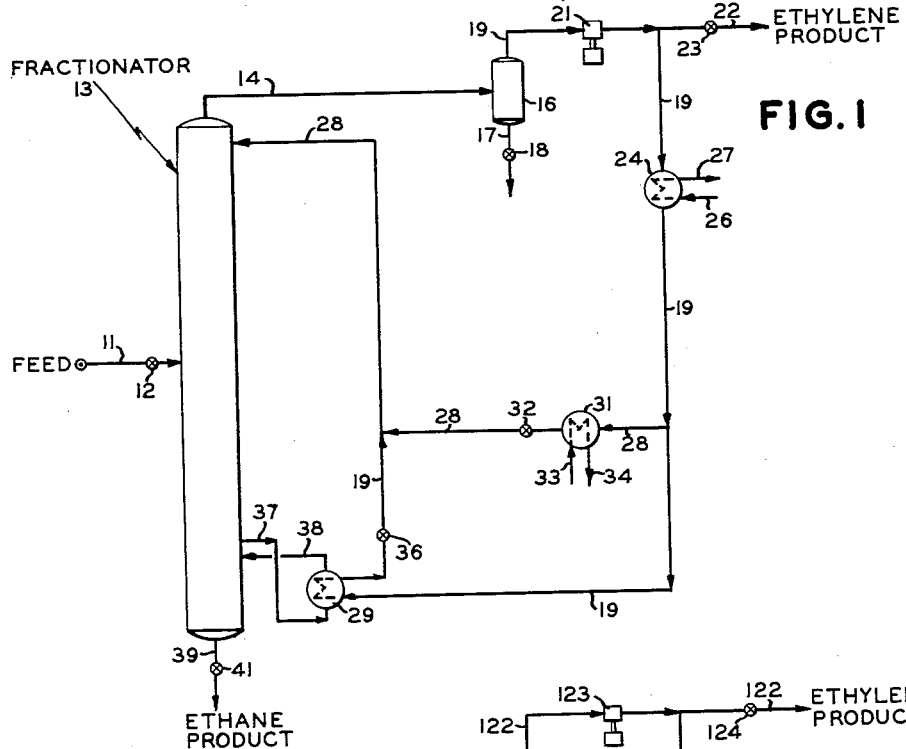

FIGURE 1 of the drawings is a diagrammatic illustration in which equipment is shown in elevation of a suitable arrangement of apparatus for carrying out an embodiment of this invention.

Figure 2:
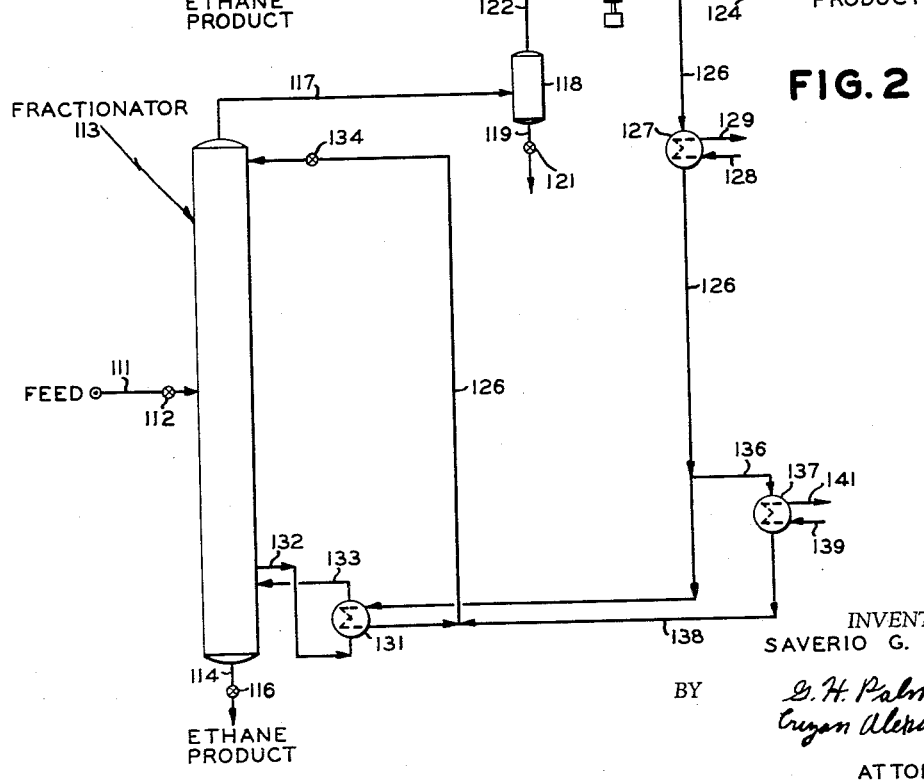

FIGURE 2 is a diagrammatic illustration in which equipment is shown in elevation of a suitable arrangement of apparatus for carrying out another embodiment of this invention.

According to one aspect of this invention, a normally gaseous hydrocarbon component is separated from a mixture of normally gaseous hydrocarbons containing the same by the method which comprises introducing said mixture of normally gaseous hydrocarbons into a distillation zone. A bottoms fraction is withdrawn from said distillation zone and a vaporous overhead fraction is also withdrawn from said distillation zone. At least a portion of the overhead fraction, which comprises a normally gaseous hydrocarbon component which it is desired to separate, is compressed and thereby heated. At least a portion of the compressed fraction is then either cooled or further heated by indirect heat exchange. At least a portion of the compressed overhead fraction which has been further heated or cooled is contacted indirectly with liquid from the lower portion of the distillation zone thereby heating and at least partially vaporizing the liquid from the distillation zone and at least partially condensing overhead. The thus condensed overhead may then be used to reflux the distillation zone while the thus vaporized liquid may be used to reboil the distillation zone.

The present invention is particularly useful in the separation of a normally gaseous olefin such as ethylene or propylene from a mixture of normally gaseous hydrocarbons containing the same. In a preferred embodiment, this invention is used in the separation of a normally gaseous olefin from a mixture containing the same and the corresponding paraffin having the same number of carbon atoms. For example, this invention may be used in the separation of ethylene from ethane in a so-called "$C_2$ splitting" operation or for the separation of propylene from propane in a "$C_3$ splitting" operation.

In accordance with this invention, the portion of the compressed heated overhead fraction which is subjected to further temperature control by indirect heat exchange may be either heated or cooled thereby depending on the requirements of the particular process involved. In any event, it is necessary to insure that enough heat is available in the overhead fraction used to supply reboiling heat for the distillation zone while at the same time sufficient liquid reflux to the distillation zone should also be supplied by the overhead fraction. Reflux for the distillation zone may be provided by utilizing compressed overhead which has been condensed in the reboiler and/or by the use of compressed overhead which has been cooled and expanded. The present invention is especially advantageous in that it provides an excellent method of controlling the operation of the distillation zone so that the proper amount of reflux and the proper reboiling heat can always be efficiently provided to allow for changes in feed, operating conditions, quantity of overhead available for use as reflux, etc. Due to practical difficulties, such as inability to vary the output conditions of the overhead compressor, it is usually not possible to compensate for changes in the above effects by varying the pressure or temperature to which overhead is heated by compression.

One aspect of this invention relates to situations in which a portion of the compressed overhead fraction must be further heated before being used to supply reboiling heat to the distillation zone. This situation may occur for instance, when the composition of the feed varies or the amount of overhead available for supplying reboiling heat is reduced so that it is necessary to add more heat to the overhead fraction following compression. The portion of overhead which is thus further heated can then be used at least in part to supply reboiling heat to the distillation zone. It may be desired to provide means for cooling a portion of the further heated overhead, if necessary. Such means may for instance be useful where minor variations are incurred in operating conditions, feed, etc. By providing both heating and cooling means, it is possible to exercise a greater degree of control over the system. In this case it may be desirable to use only part of the further heated overhead to supply reboiling heat while the remainder is passed through the above mentioned cooling means. The total amount of further heated overhead is then expanded and used as reflux to the distillation zone. When this aspect of the present invention is used in connection with the separation of ethylene from ethane the distillation zone is preferably maintained at a pressure between about 90 and about 100 p.s.i.g. The distillation zone preferably has a top temperature of about −80 to about −70° F. under the preferred pressure conditions. Overhead from the distillation zone is preferably compressed to a pressure between about 160 and about 540 p.s.i.g., thereby increasing its temperature to between about 30 and about 100° F. The portion of the compressed overhead which is further heated is preferably heated to a temperature between about 40 and about 110° F. and the temperature of this portion of overhead is then reduced to between about −50 and about 30° F. by use in the reboiler and, if desired, by further cooling a part of this portion as described above.

Another aspect of the present invention relates to situations in which it becomes desirable to cool the portion of the compressed overhead which is used to supply reflux to the distillation zone. In this preferred embodiment of this invention, the overhead fraction is compressed sufficiently so that it has sufficient heat capacity for use in the reboiler. This is particularly desirable because, as previously mentioned, it is not practical to vary the extent of compressing the overhead to allow for variations in compositions of feed, etc. In this situation the portion of compressed overhead which is to be used as reflux is first cooled by indirect heat exchange and part or all of the thus cooled overhead is used to supply reboiling heat whereby the overhead so used is at least partially condensed and is then returned to the distillation zone as reflux thereto. It may be desirable, in the event this procedure is followed, to provide additional cooling means whereby a portion of the compressed and cooled overhead fraction may be further cooled by indirect heat exchange prior to being used as reflux rather than being further cooled for use in the reboiler prior to being used as reflux. When this preferred embodiment of the present invention is used in a process for the separation of ethylene from ethane, the distillation zone is preferably maintained at a pressure between about 90 and about 100 p.s.i.g. Under the preferred pressure conditions, the distillation zone is preferably maintained at a top temperature between about −80 and about −70° F. and a bottom temperature between about −30 and about −50° F. The overhead is preferably compressed to a pressure between about 150 and about 550 p.s.i.g., thereby heating the compressed overhead to a temperature between about 30 and about 100° F. The portion of the compressed overhead to be used as reflux is preferably cooled to a temperature between about 20 and about 90° F. and is then preferably further cooled to a temperature between about −30 and about 50° F. by use in the reboiler and/or by the use of auxiliary refrigerant.

For a better understanding of this invention, reference should be had to the accompanying drawings.

In FIGURE 1, feed having the composition shown in Table I enters through conduit 11 and a valve 12 at the rate of 81,989 pounds per hour. Feed from conduit 11 enters a fractionator 13 which is a conventional distillation tower. The upper portion of fractionator 13 is maintained at a temperature of −77° F. and a pressure of 93 p.s.i.g., while the lower portion of fractionator 13 is maintained at a temperature of −40° F. and a pressure of 98 p.s.i.g. The feed has been obtained from a mixture of refinery gases from various sources such as catalytic cracking units, reforming units, etc., and this mixture has been previously treated for the separation of a fraction rich in $C_2$ hydrocarbons which is used as the feed to the present process.

TABLE I

*Feed composition*

| Component: | Lb./hr. |
|---|---|
| Methane | 98 |
| Ethylene | 34,591 |
| Ethane | 45,273 |
| Propylene | 1,675 |
| Propane | 352 |
| | 81,989 |

An overhead fraction comprising ethylene product is withdrawn from fractionator 13 through conduit 14 and passed to a separation drum 16.

TABLE II

*Composition of ethylene product*

| Component: | Lb./hr. |
|---|---|
| Methane | 520 |
| Ethane | 980 |
| Ethylene | 181,000 |
| | 182,500 |

In separation drum 16, any entrained liquid present, separates from the overhead vapors and may be removed therefrom through conduit 17 and a valve 18. Overhead vapors are removed from separation drum 16, through conduit 19 and passed through a compressor 21 where they are compressed to a pressure of 270 p.s.i.g. and a temperature of 49° F. A portion of the compressed overhead from conduit 19 is withdrawn from the system through conduit 22 and a valve 23 as ethylene product at the rate of 33,992 pounds per hour. The remaining 182,500 pounds per hour of compressed overhead in conduit 19 having the composition shown in Table II continues to a heat exchanger 24 where it is cooled to a temperature of 10° F. by indirect heat exchange with propane at a temperature of 0° F. which enters heat exchanger 24 through conduit 26 and leaves through conduit 27. Part of the overhead fraction in conduit 19 passes from heat exchanger 24 to a reboiler 29 while the remainder passes through conduits 19 and 28 to a heat exchanger 31 at the rate of 39,000 pounds per hour. The portion of the overhead which passes through conduit 28 is further cooled and condensed at a temperature of −24° F. in heat exchanger 31 and is then passed to a pressure reducing valve 32. From valve 32 the overhead in conduit 28 is returned to fractionator 13 as reflux thereto. Cooling duty for heat exchanger 31 is provided by vaporizing propane which enters through conduit 33 at a temperature of −34° F. and leaves through conduit 34 at a temperature of −34° F.

The overhead fraction in conduit 19 which is not passed through conduit 28 as explained above, continues through conduit 19 at the rate of 143,500 pounds per hour to reboiler 29. In reboiler 29, the overhead fraction in conduit 19 is indirectly contacted with material from fractionator 13 and the temperature of the overhead in conduit 19 is thereby reduced to −24° F. Liquid from the lower portion of fractionator 13 is passed to reboiler 29 through conduit 37 and is returned to fractionator 13 through conduit 38. From reboiler 29, the overhead in conduit 19 passes through a pressure reducing valve 36 and is then returned to fractionator 13 as reflux thereto via conduits 19 and 28.

A bottoms fraction comprising ethane product is withdrawn from fractionator 13 through conduit 39 and a valve 41. This bottoms fraction may be disposed of in any suitable manner such as being used as feed for an ethane pyrolysis process. The bottoms fraction withdrawn through conduit 39 has the composition shown in Table III.

TABLE III
*Composition of ethane product*

| Component: | Lb./hr. |
|---|---|
| Ethylene | 880 |
| Ethane | 45,090 |
| Propylene | 1,075 |
| Propane | 352 |
| | 47,997 |

In FIGURE 2, feed gas having the composition shown in Table IV enters through conduit 111 and a valve 112 at the rate of 63,392 pounds per hour. The feed gas entering through conduit 111 is a fraction comprising predominately $C_2$ hydrocarbons which has been separated from a mixture of refinery gases from various sources such as catalytic cracking units, reforming units, etc.

TABLE IV
*Feed composition*

| Component: | Lb./hr. |
|---|---|
| Methane | 114 |
| Ethylene | 39,868 |
| Ethane | 22,943 |
| Propylene | 357 |
| Propane | 110 |
| | 63,392 |

The feed gas in conduit 111 passes to a fractionator 113 which is a conventional distillation column. The upper portion of fractionator 113 is maintained at a pressure of 93 p.s.i.g. while the lower portion is maintained at a pressure of 98 p.s.i.g. A bottoms fraction comprising ethane product is withdrawn from fractionator 113 through conduit 114 and a valve 116 at a temperature of −40° F. and at a rate of 23,634 pounds per hour. The bottoms fraction withdrawn through conduit 114 has the composition shown in Table V and may be used in any suitable manner. For example, the fraction withdrawn through conduit 114 may be used as the feed material for an ethane pyrolysis process.

TABLE V
*Composition of ethane product*

| Component: | Lbs./hr. |
|---|---|
| Ethylene | 437 |
| Ethane | 22,730 |
| Propylene | 357 |
| Propane | 110 |
| | 23,634 |

An overhead fraction comprising ethylene product is withdrawn from fractionator 113 through conduit 117 at a temperature of −77° F. and at a rate of 169,058 pounds per hour.

TABLE VI
*Composition of ethylene product*

| Component | Lb./hr. |
|---|---|
| Methane | 370 |
| Ethylene | 128,300 |
| Ethane | 630 |
| | 129,300 |

The overhead fraction in conduit 117 passes to a separator drum 118 in which any entrained liquid is separated from the gaseous overhead fraction. Any liquid present is withdrawn from separator drum 118 through conduit 119 and a valve 121 while the gaseous overhead is withdrawn from separator drum 118 through conduit 122 and passed to a compressor 123. In compressor 123 the overhead fraction in conduit 122 is compressed to a pressure of 265 p.s.i.g. and its temperature is thereby raised to 49° F.

From compressor 123, a portion of the compressed overhead continues through conduit 122 and is withdrawn from the system as ethylene product through conduit 122 and a valve 124 at the rate of 39,758 pounds per hour. The remainder of the compressed overhead having the composition shown in Table VI passes through conduits 122 and 126 to a heat exchanger 127. In heat exchanger 127, the overhead in conduit 126 is heated to a temperature of 55° F. by indirect contact with condensing propylene which enters through conduit 128 at a temperature of 70° F. and leaves through conduit 129 at a temperature of 80° F. From heat exchanger 127 the warmed overhead continues through conduit 126 to a reboiler 131. In reboiler 131, the compressed and further heated overhead in conduit 126 is cooled and at least partially condensed by indirect heat exchange with liquid which is withdrawn from the lower portion of fractionator 113 through conduit 132 and is returned to fractionator 113 through conduit 133. From reboiler 131 the overhead in conduit 126 is returned to fractionator 113 through conduit 126 and a pressure reducing valve 134. The overhead thus returned to fractionator 113 serves to reflux the fractionator.

In some circumstances it may be desirable to provide means for cooling a portion of the compressed and further heated overhead without passing the same to reboiler 131. If this is the case, a portion of the overhead in conduit 126 may be withdrawn through conduit 136, cooled in a heat exchanger 137 by indirect contact with an auxiliary refrigerant, and then returned to conduit 126 through conduit 138. Auxiliary refrigerant used in heat exchanger 137 enters through conduit 139 and leaves through conduit 141.

FIGURES 1 and 2 described above illustrate two of the many arrangements of apparatus which may be used to carry out various embodiments of this invention. For example, both FIGURES 1 and 2 describe an operation for the separation of ethylene and ethane. This process may equally well be used for the separation of propylene from propane or for any other suitable separation of a normally gaseous hydrocarbon from a mixture of normally gaseous hydrocarbons containing the same. It will be appreciated that numerous changes in the apparatus described above may be made without departing from the scope of this invention.

I claim:

1. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, compressing at least a portion of said overhead fraction thereby heating the same, further regulating the temperature to control the heat balance of at least a portion of the compressed overhead fraction by indirect heat exchange with at least one externally supplied heat exchange medium, indirectly contacting at least a portion of the overhead fraction thus further regulated as to temperature with liquid from the lower portion of said distillation zone thereby heating and at least partially vaporizing said liquid and at least partially condensing said portion of temperature regulated overhead fraction, returning said vaporizing liquid to the lower portion of said distillation zone and passing all of said partially condensed overhead to said distillation zone as reflux thereto.

2. The process according to claim 1 in which the overhead fraction comprises a normally gaseous olefin and the bottoms fraction comprises a normally gaseous paraffin having the same number of carbon atoms as the olefin.

3. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, compressing at least a portion of said overhead fraction thereby heating the same, cooling at least a portion of the compressed overhead fraction by indirect heat exchange with at least one externally supplied heat exchange medium, indirectly contacting at least a portion of the thus cooled overhead fraction with liquid from the lower portion of said distillation zone thereby heating and at least partially vaporizing said liquid and at least partially condensing said portion of cooled overhead fraction, returning said vaporizing liquid to the lower portion of said distillation zone and passing all of said partially condensed overhead to said distillation zone as reflux thereto.

4. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, comprising at least a portion of said overhead fraction thereby heating the same, further heating at least a portion of the compressed overhead fraction by indirect heat exchange with at least one externally supplied heat exchange medium, indirectly contacting at least a portion of the overhead fraction thus further heated with liquid from the lower portion of said distillation zone thereby heating and at least partially vaporizing said liquid and at least partially condensing said portion of further heated overhead fraction, returning said vaporized liquid to the lower portion of said distillation zone and passing all of said partially condensed overhead to said distillation zone as reflux thereto.

5. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, compressing said overhead fraction thereby heating same, withdrawing a portion of compressed overhead as a product of the process, further heating another portion of compressed overhead by indirect heat exchange with at least one externally supplied heat exchange medium, indirectly contacting said further heated overhead with liquid from the lower portion of said distillation zone whereby said liquid is at least partially vaporized and said overhead is at least partially condensed, returning the thus vaporized liquid to the lower portion of said distillation zone and passing all of said partially condensed overhead to the upper portion of said distillation zone as reflux thereto.

6. The process according to claim 5 in which the overhead fraction comprises ethylene and the bottoms fraction comprises ethane.

7. The process according to claim 5 in which the overhead fraction comprises a normally gaseous olefin and the bottoms fraction comprises a normally gaseous paraffin having the same number of carbon atoms as the normally gaseous olefin.

8. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, compressing said overhead fraction thereby heating the same, withdrawing a portion of compressed overhead fraction as a product of the process, cooling another portion of compressed overhead by indirect heat exchange with an externally supplied heat exchange medium, further cooling and partially condensing a portion of the thus cooled compressed overhead by indirect heat exchange with an externally supplied heat exchange medium and returning the thus further cooled and partially condensed overhead to the distillation zone as reflux thereto, passing another portion of the cooled compressed overhead in indirect heat exchange with liquid from the lower portion of the distillation zone thereby at least partially condensing overhead and passing all of said partially condensed overhead to the upper portion of said distillation zone as reflux thereto.

9. The process according to claim 8 in which the overhead comprises ethylene and the bottoms fraction comprises ethane.

10. The process according to claim 8 in which the overhead comprises a normally gaseous olefin and the bottoms fraction comprises a normally gaseous paraffin having the same number of carbon atoms as the normally gaseous olefin.

11. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, compressing said overhead fraction thereby heating the same, withdrawing a portion of compressed overhead fraction as a product of the process, heating another portion of compressed overhead by indirect heat exchange with an externally supplied heat exchange medium, cooling and at least partially condensing a portion of the thus heated compressed overhead by indirect heat exchange with an externally supplied heat exchange medium and returning the thus cooled and at least partially condensed overhead to the distillation zone as reflux thereto, passing another portion of the heated compressed overhead in indirect heat exchange with liquid from the lower portion of the distillation zone thereby at least partially condensing overhead and passing all of said partially condensed overhead to the upper portion of said distillation zone as reflux thereto.

12. The process for the separation of a normally gaseous hydrocarbon component from a mixture of normally gaseous hydrocarbons containing the same which comprises introducing said mixture into a distillation zone, withdrawing a bottoms fraction from said distillation zone, withdrawing a vaporous overhead fraction comprising said component from said distillation zone, compressing at least a portion of said overhead fraction thereby heating the same, withdrawing a portion of compressed overhead fraction as a product of the process, cooling another portion of the compressed overhead fraction by indirect heat exchange with at least one externally supplied heat exchange medium, indirectly contacting at least a portion of the thus cooled overhead fraction with liquid from the lower portion of said distillation zone thereby heating and at least partially vaporizing said liquid and at least partially condensing said portion of cooled overhead fraction, returning said vaporized liquid to the lower portion of said distillation zone and passing all of said partially condensed overhead to said distillation zone as reflux thereto.

13. The process according to claim 12 in which the overhead fraction comprises ethylene and the bottoms fraction comprises ethane.

14. The process according to claim 13 in which said distillation zone is maintained at a pressure between about 90 and about 100 p.s.i.g., at a top temperature between about −80 and about −70° F. and a bottom temperature between about −30 and about −50° F.

References Cited in the file of this patent

UNITED STATES PATENTS

| | | |
|---|---|---|
| 1,073,843 | Blau | Sept. 23, 1913 |
| 2,127,004 | Nelson | Aug. 16, 1938 |
| 2,600,110 | Hachmuth | June 10, 1952 |
| 2,619,814 | Kniel | Dec. 2, 1952 |
| 2,629,239 | Gantt | Feb. 24, 1953 |
| 2,729,954 | Etienne | Jan. 10, 1956 |
| 2,743,590 | Grunberg | May 1, 1956 |
| 2,775,103 | Koble et al. | Dec. 25, 1956 |
| 2,820,352 | Fokker et al. | Jan. 21, 1958 |

UNITED STATES PATENT OFFICE
CERTIFICATE OF CORRECTION

Patent No. 3,000,188                                    September 19, 1961

Saverio G. Greco

It is hereby certified that error appears in the above numbered patent requiring correction and that the said Letters Patent should read as corrected below.

Column 3, line 26, for "reffux" read -- reflux --; column 6, line 67, and column 7, line 17, for "vaporizing", each occurrence, read -- vaporized --; column 7, lines 27 and 28, for "comprising" read -- compressing --.

Signed and sealed this 13th day of February 1962.

(SEAL)
Attest:

ERNEST W. SWIDER                                          DAVID L. LADD
Attesting Officer                                                  Commissioner of Patents